(12) United States Patent
Cornic et al.

(10) Patent No.: US 6,429,805 B1
(45) Date of Patent: Aug. 6, 2002

(54) LOW-COST RADAR WITH HIGH-RESOLUTION IMAGING

(75) Inventors: Pascal Cornic, St Renan; Philippe Laviec, Plougastel Daoulas; Dominique Lo-Hine Tong, Brest, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/836,360

(22) Filed: Apr. 18, 2001

(30) Foreign Application Priority Data

Apr. 18, 2000 (FR) .............................. 00 04983

(51) Int. Cl.[7] .................... G01S 13/00; H01Q 3/22; H01Q 3/24; H01Q 3/26
(52) U.S. Cl. ................... 342/70; 342/21; 342/195; 342/368
(58) Field of Search .................. 342/21, 39, 70, 342/123, 195–197, 368–376

(56) References Cited

U.S. PATENT DOCUMENTS

| | | | |
|---|---|---|---|
| 5,351,053 A | 9/1994 | Wicks et al. | 342/158 |
| 5,420,591 A | 5/1995 | Annee et al. | 342/188 |
| 5,504,490 A | 4/1996 | Brendle et al. | 342/118 |
| 5,598,163 A | 1/1997 | Cornic et al. | 342/70 |
| 5,815,112 A | 9/1998 | Sasaki et al. | 342/70 |
| 5,877,726 A * | 3/1999 | Kudoh et al. | 343/700 |
| 5,923,284 A | 7/1999 | Artis et al. | 342/129 |
| 5,955,991 A * | 9/1999 | Kawakubo | 342/374 |
| 5,959,570 A | 9/1999 | Russell | 342/70 |
| 6,008,760 A * | 12/1999 | Shattil | 342/378 |
| 6,023,238 A | 2/2000 | Cornic et al. | 342/129 |
| 6,297,764 B1 * | 10/2001 | Wormington et al. | 342/101 |

FOREIGN PATENT DOCUMENTS

EP 0 919 828 A2 6/1999

* cited by examiner

Primary Examiner—Thomas H. Tarcza
Assistant Examiner—Brian Andrea
(74) Attorney, Agent, or Firm—Oblon, Spivak, McClelland, Maier & Neustadt, P.C.

(57) ABSTRACT

A radar including a plurality of reception antennas corresponding to a plurality of homodyne reception channels, and a transmission antenna positioned with respect to the plurality of reception antenna such that a distance between the transmission antenna and each consecutive reception antenna of the plurality of reception antenna respectively increases from one reception antenna to the next. Also included is a beam-formation mechanism associated with the plurality of reception channels for receiving a reception signal from each of the homodyne reception channels. Further, a spacing between each reception antenna is set so as to orient a homodyne leakage in a direction located in an angular zone of space not processed by the radar.

46 Claims, 5 Drawing Sheets

LOW-COST RADAR WITH HIGH-RESOLUTION IMAGING

BACKGROUND OF THE INVENTION

1. Field of the Invention

The present invention relates to a low-cost radar, especially with high-resolution imaging. It can be applied especially to short-distance surveillance radars as such as for example radars used to monitor level crossings, cross-roads and parking lots.

Road networks still contain many level crossings, both hand-operated and automatic. Unfortunately, there are many accidents that occur regularly. To reduce the risk of accidents, it may be useful to have means to monitor level crossings. These means would, in addition, send information to approaching trains on traffic conditions in the vicinity of these level crossings. These monitoring means must be operational at all times, by day and by night. An imaging radar meets these constraints.

2. Description of the Prior Art

There are many types of imaging radars. These include especially:

Mechanical scanning radars

Electronic scanning radars,

Radars with beam-formation by computation (hereinafter called FFC)

Mechanical scanning radars cannot be used to obtain an instantaneous view of the observed scene. They are furthermore costly because of the presence of the mechanical elements needed to move the antenna. Finally, they have mediocre reliability, especially because of the wear and tear on the mechanical elements.

Electronic scanning radars for their part can be used to obtain an almost simultaneous view of the observed scene. However, they use complicated electronic circuits and have to comply with very severe manufacturing constraints, related to the control of the phase and amplitude on each radiating element of the antenna. This makes them very costly and limits their field of application.

Antennas with beam-formation by computation are used to obtain an instantaneous view of the observed scene. The control of the phase and amplitude on each of the reception antenna elements is performed directly by the algorithm for beam-formation by computation and the dispersions of the antenna and the analog reception channels may be compensated for by this processing. However, these radars use heterodyne reception. Consequently, each reception antenna element is followed by a complex reception chain comprising especially mixing, amplification, filtering and encoding means. The cost of this type of radar is therefore especially high.

It is an aim of the invention to enable the making of an economical imaging radar of the type with beam-formation by computation.

SUMMARY OF THE INVENTION

To this end, an object of the invention is a radar comprising means of beam-formation by computation associated with N homodyne reception channels, each channel giving a reception signal to the means of beam-formation by computation, the transmission antenna being positioned in such a way that its distance increases from one reception antenna to the next. The spacing between the antennas is defined so that the homodyne-related leakage is oriented in a direction located in an angular zone of the space that is not processed by the radar.

The distance from the transmission antenna, for example, increases regularly from one reception antenna to the next one. In particular, the antennas of the reception channels are, for example, aligned with a substantially constant spaced between two consecutive antennas.

Advantageously, the radar makes use of the homodyne-related leakage to carry out a self-test of the transmission/reception function.

In one embodiment, the reception antennas are, for example, made on one and the same printed circuit.

The main advantages of the invention, in particular, are that it provides high resolution on a wide frequency band, is suited to numerous applications, provides for very high manufacturing reproducibility and high operating safety, and enables modular operation of the radar.

BRIEF DESCRIPTION OF THE DRAWINGS

Other features and advances of the invention shall appear from the following description, made with reference to be appended drawings of which.

MORE DETAILED DESCRIPTION

Figure 1:
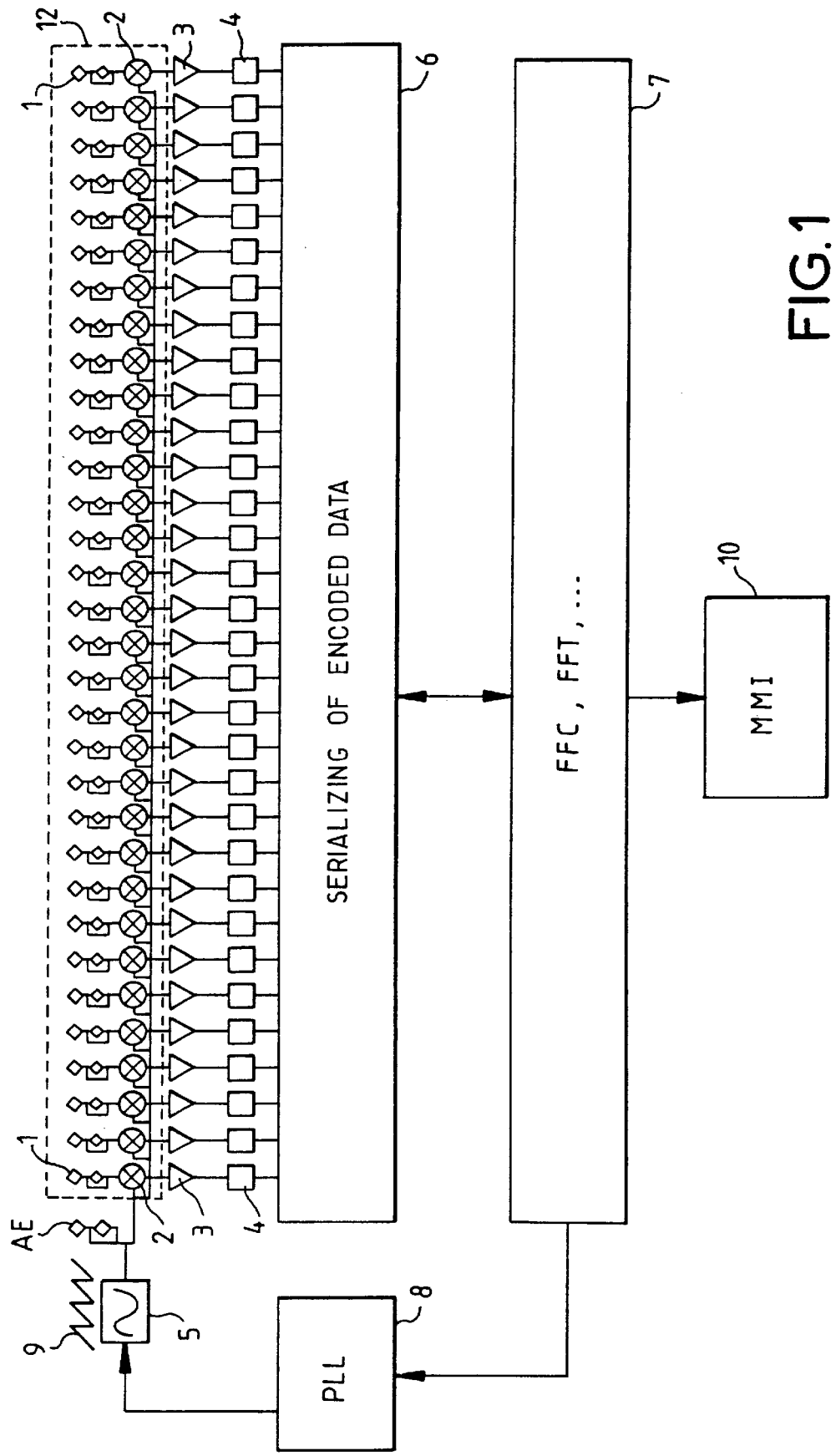
FIG. 1 is a block diagram showing a possible exemplary embodiment of the invention.

In FIG. 1, a block diagram shows a possible embodiment of a radar a according to the invention. This radar has, for example, an imaging function. It is a radar with beam-formation by computation with homodyne reception. The reception chain then essentially consists of a demodulation of the signal received by each elementary antenna by the local transmission, filtering, amplification and encoding oscillator. Since the reception is done in baseband, it is possible to use low-cost, mass-market components for the reception chain. Reception of this kind may, nevertheless, have a dissuasive drawback for use in radar imaging surveillance. This drawback is the deterioration of the sensitivity of the radar because of homodyne-related leakages. This loss of sensitivity is present especially at short distances. This corresponds to the use of radar for proximity surveillance as for example in the surveillance of the level crossings or crossroads. As will be seen in the following description, the invention overcomes the above-mentioned drawback by advantageously obtaining a compression of the homodyne-related leakages in a direction that is given and therefore controllable.

A radar according to the invention, as shown in FIG. 1, thus has several parallel reception channels for beam-formation by computation. Hereinafter, by way of an example, it will be assumed that the radar has 32 reception channels. A reception channel comprises an elementary reception channel 1, a microwave mixer 2, an amplifier 3, and an analog-digital converter 4. More particularly, an elementary antenna 1 is connected to a first input of a mixer 2. The second input of this mixer receives the signal produced by the local transmission oscillator. Since the radar is of the homodyne type, there is no frequency transposition to an intermediate frequency. The output of the mixer, which thus comprises the reception signal demodulated by the local oscillator signal, is connected to the input of an amplifier 3 whose output is connected to the input of a converter 4. This converter 4 converts the analog reception signal into a digital signal designed especially to be processed by the computation means for beam-formation by computation, hereinafter called FFC. The 32 digital signals coming from the 32 reception channels are processed, for example, by data-serializing means 6. In other words, the 32 parallel signals are, for example, series-mounted in order to be sent to the means of beam-formation by computation 7. These means are made in a known way by means of signal processors. These means are furthermore associated, for example on the same hardware circuits, with Fast Fourier Transform or FFT computation means, as well as by other known radar-processing means. These means, for example, also give the radar waveform digital command transmitted to the local oscillator 5 by means of a phase-locked loop or PLL 8. The produced waveform 9 is, for example, that of an FMCW radar, namely a continuous waveform whose frequency is linearly modulated in rising or descending ramps. Other waveforms are possibly, for example waveforms of the frequency-hopping type. The radar processing means 7 are, for example, connected to a man-machine interface 10, designed especially to use the radar image.

At transmission, the output of the local oscillator is connected to a transmission antenna AE. This local oscillator has a signal at output that is powerful enough for transmission, but also to power the 32 mixers 2. Advantageously, the transmission antenna is placed away from the reception antenna so as not to disturb the reception.

Each reception and transmission antenna 1, AE is, for example, is formed by two patches. The reception antennas 1 are, for example, made on one and the same printed circuit 12. Preferably, the mixer circuits 2 arm themselves also made on this same printed circuit. Provided that a few precautions are taken, the transmission antenna too can be made on this printed circuit.

Figure 2:
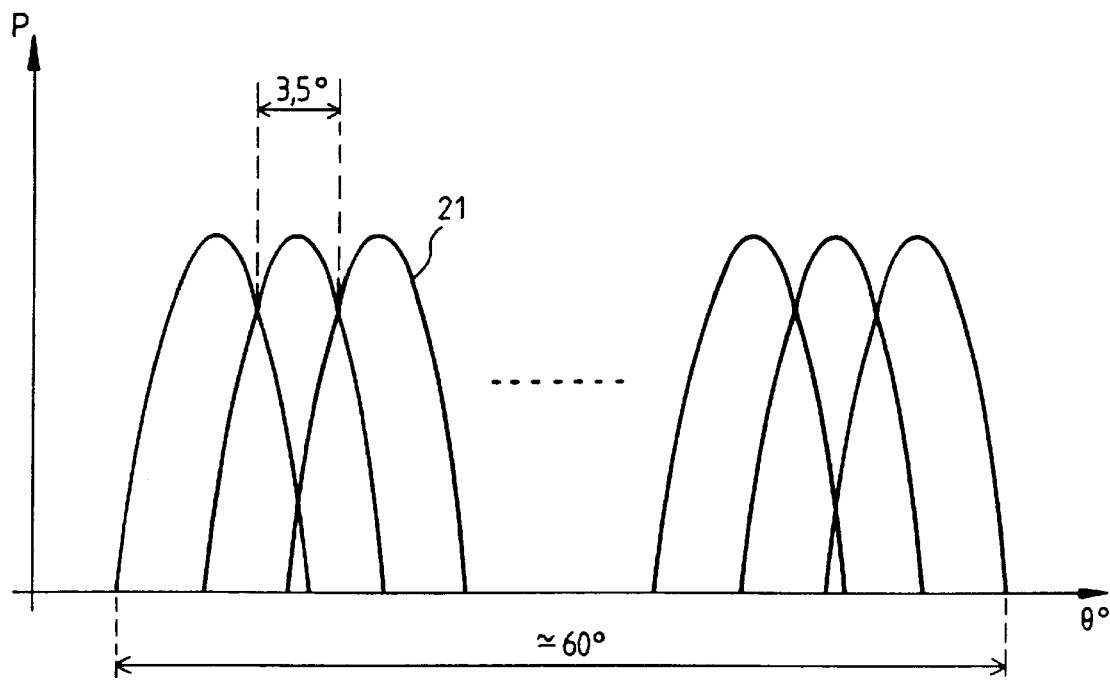
FIG. 2 is an illustration of the elementary antenna beams of a radar according to the invention.

FIG. 2 shows the resolution obtained by FFC along with the angular reception domain for the use of 32 reception channels. The FFC can be used to compute 32 elementary beams 21 that overlap. The angular width taken up by these two elementary beams is, for example, in the range of 60°, corresponding to the angle of action of the radar. The resolution corresponds to the width of an elementary beam minus its overlapping zones, which corresponds for example to an angle of about 3.5 degrees, characterizing the resolution of the radar. An FFC radar can therefore be used to obtain high resolution on a wide angular domain provided that a sufficient number of reception channels is planned.

The homodyne reception technique is also economical, because it avoids a certain degree of complexity of circuits and enables the use, for the reception chain, of computer components for large-scale consumption that are therefore low-cost components. These costs are further reduced by making a part of the reception circuits, especially the elementary antennas 1 and the mixer circuit 2, by the printed circuit technique. The conductive zones performing the antennas 1, the mixers 2 and the microwave lines may indeed be obtained by chemical machining on an organic support according to the standard printed circuit technique which is well tested and cost little. Apart from the economic aspect, this method also yields high reproducibility of parts and great reliability of operation. Finally, the goal of cost reduction can also be pursued by printing all the elements, namely the antennas, the mixers, and the microwave lines, on one and the same face of the support. This also prevents the making of larger numbers of crossings for the microwave signals on the printed circuit. These crossings are thus reduced to a single passage of the signal given by the local oscillator 5 and possibly for the transmission signals if the transmission antenna is also present on the printed circuit.

The invention thus be can used to obtain a high-resolution economical imaging radar. Advantageously, the invention can be used to control homodyne-related leakages which disturb reception.

Figure 3:
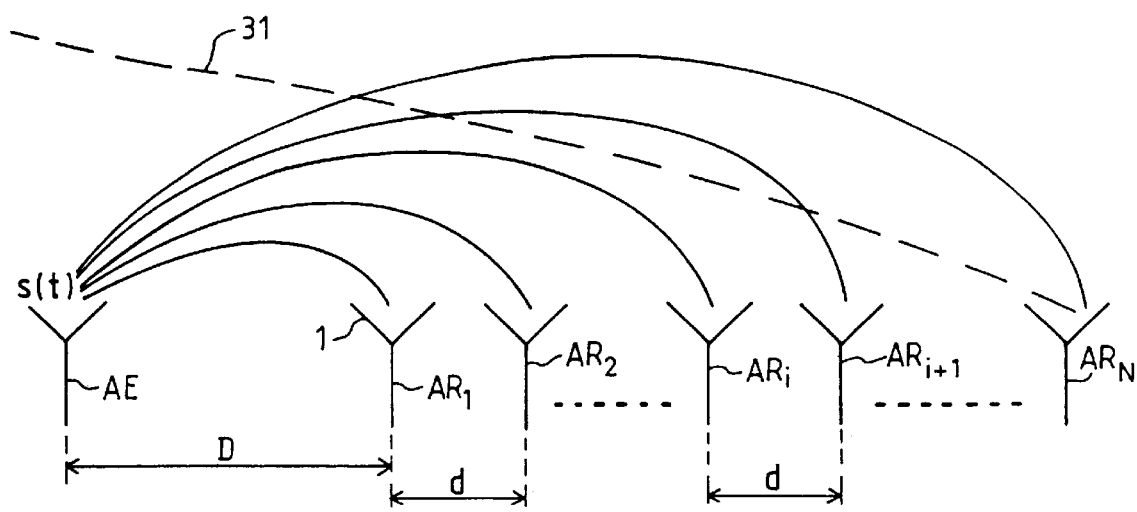
FIG. 3 illustrates the arrangement of the elementary reception antenna in a radar according to the invention.

FIG. 3 shows an arrangement of the reception antennas used to reject these leakages in a given direction, and used to control them. The reception antennas, referenced $AR_1$, $AR_2$, ... $AR_i$, $AR_{i+1}$, ... $AR_N$, are evenly aligned, namely with a substantially constant space d between two consecutive antennas. The transmission antenna AE is aligned, for example, with the reception antennas without being mixed with them. It is at least arranged in such a way that its distance increases evenly from one reception antenna to another, namely that its distance increases for example with a constant pitch. In the example of FIG. 3, the reception antenna is at an unspecified distance D from a first antenna $AR_1$, then at a distance D+d from a second antenna $AR_2$, and then at a distance D+2d from a third reception antenna and so on and so forth.

The transmission antenna AE radiates a microwave signal S(t) accompanied by a limited band noise, representing the homodyne-related leakage, to the reception antennas by coupling. The coupling takes place in the open but also between the transmission and reception microwave lines. Since the reception is homodyne and not heterodyne, there is no frequency transposition to overcome this radiated noise.

The homodyne-related leakage s(t) radiated by the antenna is therefore found at the first antenna with a delay T=2D/c due to the distance D, c being the speed of light. The first reception antenna $AR_1$, therefore receives the leakage s(t−T). Between the second reception antenna $AR_2$ and the first antenna $AR_1$, a delay $\tau$=2d/c gets added. This same delay gets added subsequently from one antenna to the one following it. Thus, at an instant t, the leakage radiated towards each antenna is defined as follows:

| | |
|---|---|
| Antenna $AR_1$ | $s(t - T)$ |
| Antenna $AR_2$ | $s(t - T - \tau)$ |
| Antenna $AR_i$ | $s(t - T - 2\tau)$ |
| Antenna $AR_{i+1}$ | $s(t - T - i\tau)$ |
| Antenna $AR_N$ | $s(t - T - (N - 1)\tau)$ |

The homodyne-related leakage picked up is therefore the same for all the antennas, allowing for the delay $\tau$ which has a constant value from one antenna to the next. This means that the homodyne-related leakage is picked up by the antennas in an apparent direction 31 which is perfectly defined as a function of the delays $\tau$. It is therefore possible to choose the spacing between the antennas so as to orient the homodyne-related leakage in a given apparent direction. This apparent direction depends on the real direction of arrival of the leakage and of the ambiguity diagram of the network. For example, for an antenna whose transmission source and whose reception sources or antennas are aligned, the direction of arrival of the leakage is close to 90°. This leakage is not perceived directly. It is perceived through the ambiguity pattern of the network in a direction defined by an angle θ verifying sineθ=(λ/d−1). Thus, for example, for d=0,7λ, we get θ=25°. Te spacing between the reception antennas can be chosen so as to direct the homodyne-related leakage in a chosen direction.

The noise that accompanies the leakage is generally early narrow-band noise and therefore undergoes the same processing. This means that it is concentrated in a special direction which, preferably, will not be used by the radar in operational mode. However, it may be used to carry out a self-test of the transmission-reception function, without any addition of complementary circuits, the matching being solely software matching. The radar according to the invention can therefore make economical and simple use of the leakage to carry out a self-test of the transmission and reception functions.

Figure 4:
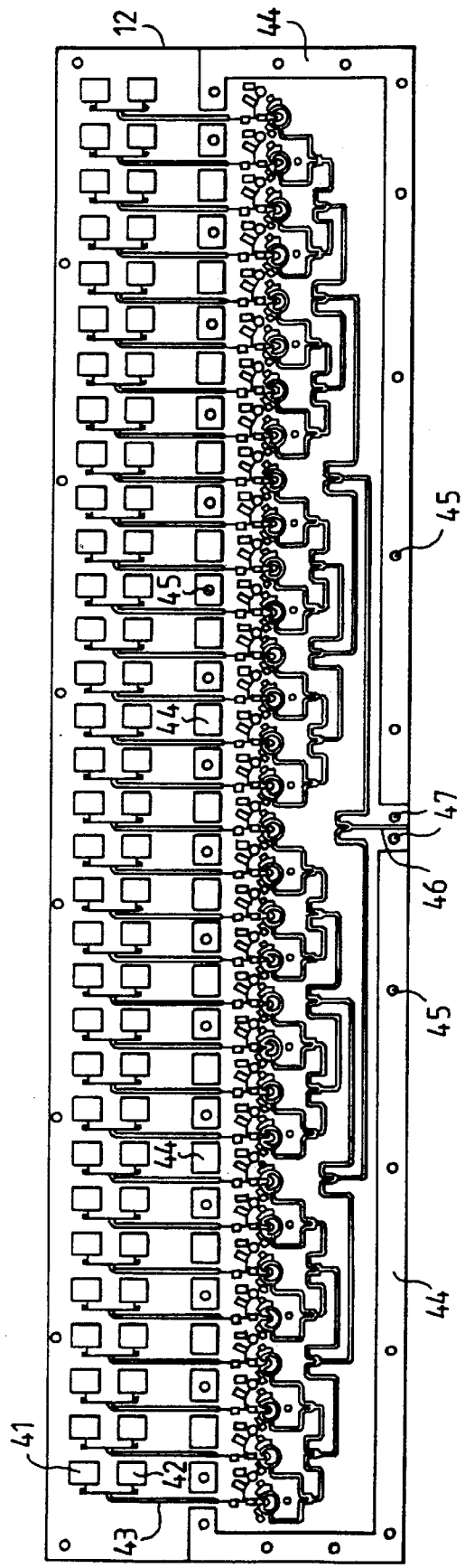
FIG. 4 is an exemplary embodiment in printed circuit form of the reception channels of a radar according to the invention.

FIG. 4 shows a possible embodiment of the reception antennas and mixers. This embodiment again shows 32 channels by way of an example. The antennas and the microwave lines are printed on a support 12 which, for example, is an epoxy type of organic support. Preferably, all these elements are printed on the same face of the support, the other face being coated with the ground plane. The antennas are aligned with a substantially constant distance from one antenna to the next one. Each elementary reception antenna comprises, for example, two patches 41,42 parallel-connected to a microwave line 43. This microwave line 43 connects the antennas to its mixer circuit 2. Advantageously, an electronic screen shields these antennas from external radiation. To this end, a metal band 44 surrounds the mixer circuits. This metal band is cut at the places in which the microwave connection lines 43 pass towards the antennas. A metal cover, not shown, then covers the mixers. The edges of the cover are placed so as to be in contact with the metal band 44. Holes 45, which may or may not be tapped, are for example provided in order to fix the cover into the support 12. The inner space between the cover and the printed circuit is, for example, filled with absorbent foam, in particular to prevent electromagnetic coupling between the different microwave lines.

The local oscillator signal is given to the mixers by a printed microwave line 46 which is subdivided into successive arms, each arm being divided for example into two, so that the length of the microwave line between the local oscillator and the mixer is the same for all the mixers. The purpose of this, especially, is that the demodulation signals present on the mixers should all be synchronous. A hole 47 is used, for example, to let through a cable conveying the microwave signal produced by the local oscillator, the core of the cable being soldered for example to the microwave lines 46 printed on the support 12.

Figure 5:
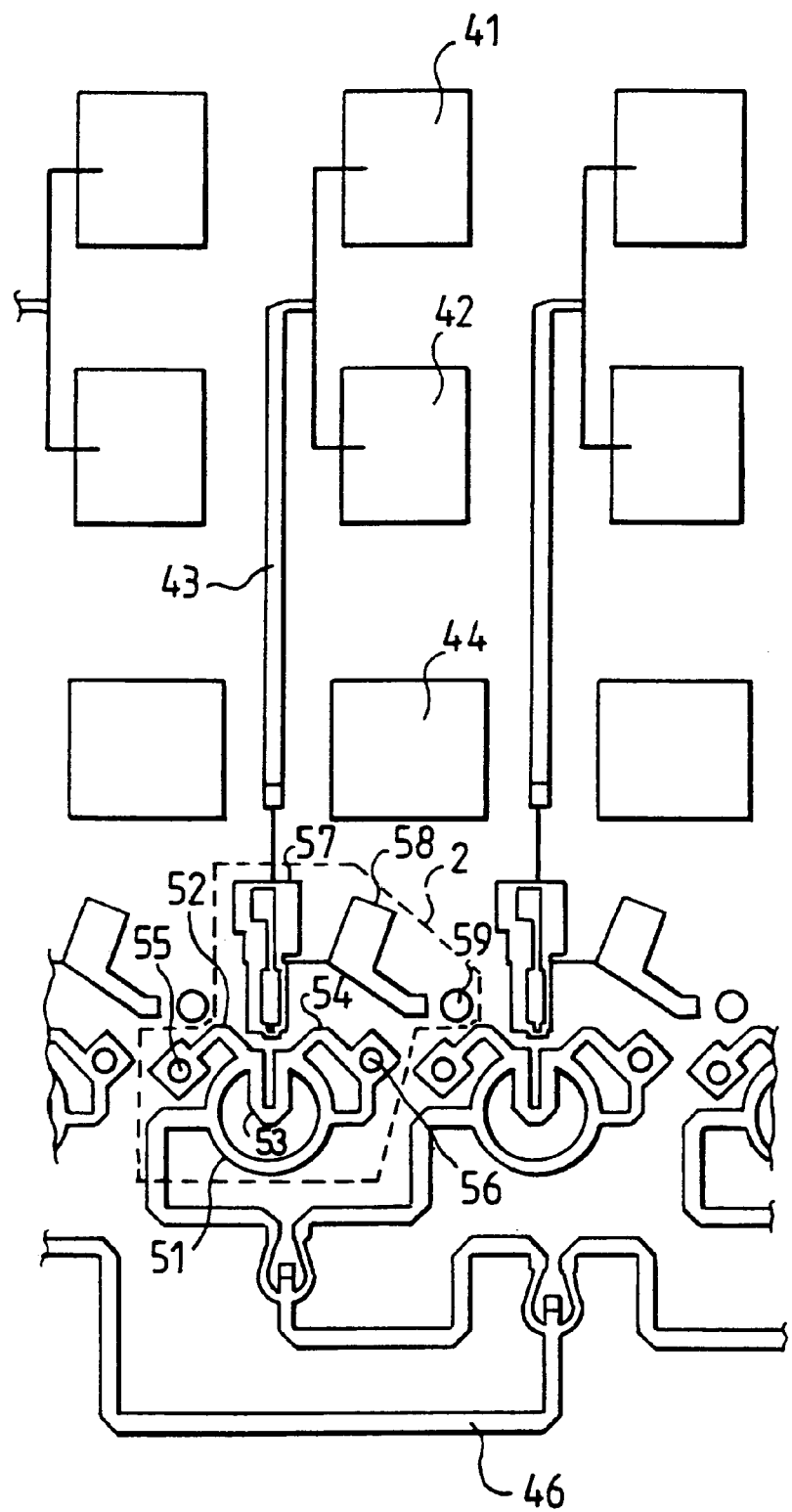
FIG. 5 is a detailed view of a reception channel in the above embodiment.

In FIG. 5, an enlarged view is used to show an embodiment of the mixers 2, one input of which receives the signal picked up by the associated elementary antenna while its other input receives the demodulation signal given by the local oscillator 5. The output of the mixer is fed into the input of the amplifier 3 of the reception channel.

An elementary antenna of the reception channel comprises, for example, two patches 41,42. The signal picked up by this elementary antenna goes through a microwave link 43 to the mixer 2. The mixer used is, for example, a balanced mixer having two diodes, not shown, mounted back to front at the output of a 0/180° wideband hybrid ring 51. Three quarter-wave lines 52, 53, 54, are used for example for the ground return connection of the diodes. The wavelength considered is the wavelength at the center frequency. A first quarter-wave line 52 separate a first ground point, represented by a metallized hole 55, from the cathode of the first diode. A second quarter-wave line 53 separates the anode of the first diode from the cathode of the second diode. A third quarter-wave line separates the cathode of the second diode from a ground point, represented by a metallized hole 56. The two diodes are furthermore connected to the line 43 connecting the patches 41,42 to the mixer and conveying the detected signal. Filtering elements 57,58 isolate the detected signal from the output signal of the mixer. The output of the mixer takes the form of a connection 59 connected to the input of the mixer 3.

The printed circuit 12, on which the elementary antennas 1 and the microwave lines are made, can be fixed to one face of a plate. On the other face of the plate, it is possible to position especially the amplifiers (3), the analog-digital converters 4, the series-connection means 6, the radar processing means 7, the phase-locked loop 8 as well as the local oscillator 5. These means are supported by printed circuits which, for example, are themselves fixed to the plate. The deck fitted out with these different circuits can be protected by a shielding provided with a microwave window facing the antennas AE 1. For example, the radar thus obtained may have a height of about 20 cm, a depth of 10 cm and a width of 80 cm, with a weight of approximately 80 kg.

Figure 6:
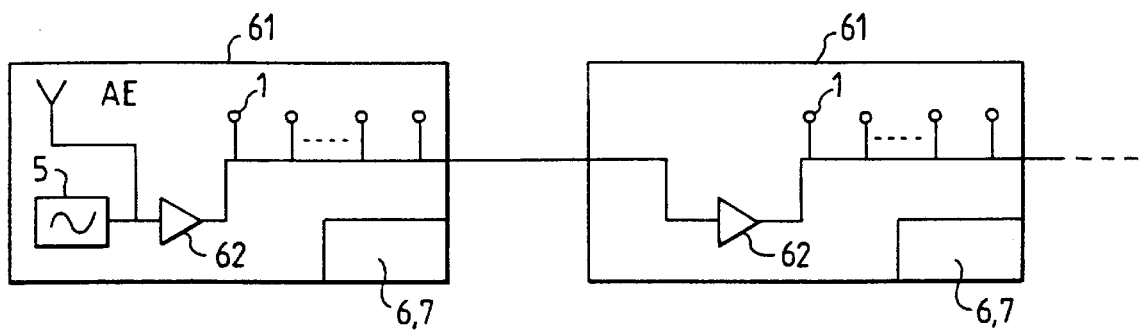
FIG. 6 is an illustration of the modular aspect of a radar according to the invention.

FIG. 6 is a block diagram showing another advantage of a radar according to the invention. This advantage is its modularity. Several radars according to the invention can indeed the parallel-wired in order to obtain a radar with higher resolution or with a wider angular domain of action. A radar of this kind, as described in the above figures, therefore shows a module 61. A first module acts as the driver module. In particular, its local oscillator 5 also controls all the other modules. To this end, each module has an amplifier 62 at input so that the signal produced by the oscillator of the first module can control all the other modules. The radar constituted by all the modules furthermore has only one active transmission antenna AE which, for example, is the antenna of the first module, this antenna being powered by the local oscillator of this first module. The transmission antennas and the local antennas of the other module may therefore remain inactive. For reasons of industrial efficiency, the modules are all, for example, identical. Thus, the output of the amplifier circuit 62 of the local oscillator signal which powers the reception circuits of the first module, furthermore enters the input of the amplification circuit 62 of the second module and so on and so forth. The radar processing circuit 6,7, especially the FFC circuits, work in parallel. The angular domain of surveillance or the angular resolution may thus be increased by the greater number of antennas and reception channels connected in parallel.

It must be noted that a radar according to the invention gives an instantaneous view of the observed scene. Furthermore, it is particularly easy to form very different antenna patterns with the same equipment. A radar according to the invention can thus be adapted to many situations. It is not necessary to carry out an self-focus operation, namely an adjusting of phases between the different reception channels. A simple gain-adjusting operation will suffice. Finally, the radar has a wideband capacity with high resolution.

A radar according to the invention can be used for many applications. It can be used especially for surveillance applications such as, for example, traffic management, the surveillance of crossroads, parking lots, level crossings and toll ways, and more generally all types of surveillance and protection of areas.

A radar according to the invention can also be used for the high-precision detection of obstacles. A radar according to the invention can thus be used to equip a robot as well as an emergency aid vehicle moving about in smoke. The modular aspect of the radar means that it can be used especially for several types of applications as a function of the angle of surveillance needed.

Figure 7:
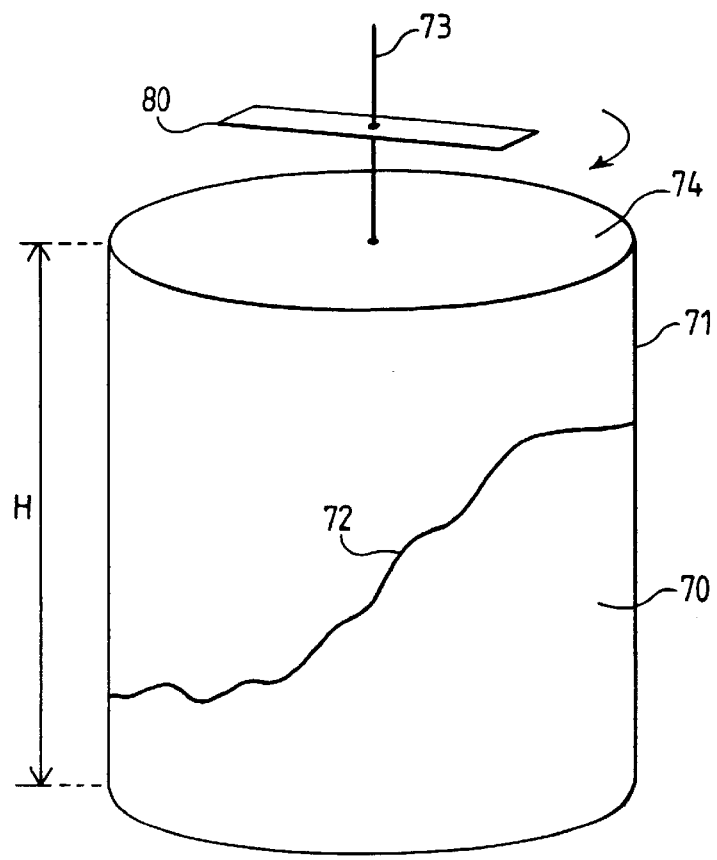
FIG. 7 shows an exemplary use of a radar according to the invention to determine the quantity of material in a container.

FIG. 7 illustrates another possible application of a radar according to the invention. It can be applied advantageously to determine the quantity of material 70 contained in a container 71 when this material is not liquid and when its upper surface 72 is not flat. The radar 80 has a shaft 73 around which it rotates. The antennas face the material 70. If the container is circular, the shaft is the same, for example, as the axis of symmetry of the container. A rotational motion is applied to the radar 80 by means of the shaft. The radar according to the invention can thus carry out a 3D mapping of the contents of the container. It can therefore determine the quantity of material 70, knowing the total height H of the container and the distance from each point of the surface 72 at the relative reference altitude 74, this reference 74 being for example the top of the container.

The exemplary applications referred to here above are of course not restrictive.

What is claimed is:

1. A radar comprising:
   a plurality of reception antennas corresponding to a plurality of homodyne reception channels;
   a transmission antenna positioned with respect to the plurality of reception antennas such that a distance between the transmission antenna and each consecutive reception antenna of the plurality of reception antenna respectively increases from one reception antenna to the next; and
   means for beam-formation by computation associated with the plurality of reception channels and for receiving a reception signal from each of the homodyne reception channels,
   wherein a spacing between each reception antenna is set so as to orient a homodyne leakage in a direction located in an angular zone of space not processed by the radar.

2. The radar according to claim 1, wherein the distance from the transmission antenna to the reception antennas increases regularly from one reception antenna to the next one.

3. The radar according to claim 2, wherein the reception antennas corresponding to the reception channels are aligned with a substantially constant space between two consecutive reception antennas.

4. The radar according to claim 1, wherein the transmission antenna is aligned with the reception antennas.

5. The radar according to claim 1, wherein the homodyne leakage is used to perform a self-test of a transmission/reception faction of the radar.

6. The radar according to claim 1, wherein each reception channel further comprises a microwave mixer, an amplifier and an analog-digital converter, and
   wherein a corresponding reception antenna is connected to a first input of a corresponding mixer, a second input of the corresponding mixer receives a signal produced by a local transmission oscillator, an output of the corresponding mixer is connected to the input of a corresponding amplifier, an output of the corresponding amplifier is connected to an input of a corresponding analog-digital converters and the corresponding analog-digital converter converts a reception analog signal into a digital signal designed to be processed by the means for beam-formation by computation.

7. The radar according to claim 6, wherein the reception antennas are patch type antennas made on one and the same printed circuit.

8. The radar according to claim 7, wherein the mixers are made on said same printed circuit.

9. The radar according to claim 6, further comprising:
   a metal band surrounding the mixers, said metal band being cut at places in which microwave connection lines pass towards the reception antennas; and
   a metal cover covering the mixers with edges of the metal cover in contact with the metal band.

10. The radar according to claim 1, wherein a waveform transmitted by the transmission antenna is of the FMCW type, a continuous waveform whose frequency is modulated in ramps.

11. The radar according to claim 1, wherein a waveform transmitted by the transmission antenna is of the frequency-hopping type.

12. The radar according to claim 1, further comprising a local oscillator for powering the transmission antenna and the reception channels.

13. The radar according to claim 12, wherein a microwave line length between the local oscillator and a respective mixer is the same for all the mixers.

14. The radar according to claim 6, wherein, with the printed circuit being fixed to a face of a plate, the other face of the plate supports the means for beam-formation by computation.

15. A modular radar comprising:
   a radar including,
   a plurality of reception antennas corresponding to a plurality of homodyne reception channels,
   a transmission antenna positioned with respect to the plurality of reception antennas such that a distance between the transmission antenna and each consecutive reception antenna of the plurality of reception antenna respectively increases from one reception antenna to the next, and
   means for beam-formation associated with the plurality of reception channels and for receiving a reception signal from each of the homodyne reception channels,
   wherein a spacing between each reception antenna is set so as to orient a homodyne leakage in a direction located in an angular zone of space not processed by the radar, and
   wherein circuits included in the means for beam-formation by computation operate in parallel.

16. The modular radar according to claim 15, wherein a first module functions as a driver module, a local oscillator of the first module controls all other modules, and each module includes an amplifier at an input to amplify a signal of the local oscillator.

17. The modular radar according to claim 15, wherein an output of the amplifier for the local oscillator signal which is fed into reception circuits of the driver module also enters an input of a power circuit of a second module.

18. The modular radar according to claim 15, wherein a transmission antenna is included in the driver module, and is fed by the local oscillator of the driver module.

19. The radar according to claim 1, further comprising a shaft around which the radar rotates to sweep an interior of a container containing a material, the reception and transmission antennas being located so as to face the material.

20. The radar according to claim 1, further comprising an imaging function.

21. The radar according to claim 7, further comprising:
a metal band surrounding the mixers, said metal band being cut at places it which microwave connection lines pass towards the reception antennas, and
a metal cover covering the mixers with edges of the metal cover in contact with the metal band.

22. The modular radar according to claim 15, further comprising a shaft around which the radar rotates to sweep the interior of a container containing a material, the reception and transmission antennas being located so as to face the material.

23. The modular radar according to claim 15, further comprising an imaging function.

24. A radar comprising:
a plurality of reception antennas corresponding to a plurality of homodyne reception channels;
a transmission antenna positioned with respect to the plurality of reception antennas such that a distance between the transmission antenna and each consecutive reception antenna of the plurality of reception antenna respectively increases from one reception antenna to the next; and
a beam-formation computational circuit associated with the plurality of reception channels and configured to receive a reception signal from each of the homodyne reception channels,
wherein a spacing between each reception antenna is set so as to orient a homodyne leakage in a direction located in an angular zone of space not processed by the radar.

25. The radar according to claim 24, wherein the distance from the transmission antenna to the reception antennas increases regularly from one reception antenna to the next one.

26. The radar according to claim 25, wherein the reception antennas corresponding to the reception channels are aligned with a substatially constant space between two consecutive reception antennas.

27. The radar according to claim 24, wherein the transmission antenna is aligned with the reception antennas.

28. The radar according to claim 24, wherein the homodyne leakage is used to perform a self-test of a transmission/reception function of the radar.

29. The radar according to claim 24, wherein each reception channel further comprises a microwave mixer, an amplifier and an analog-digital converter, and
wherein a corresponding reception antenna is connected to a first input of a corresponding mixer, a second input of the corresponding mixer receives a signal produced by a local transmission oscillator, an output of the corresponding mixer is connected to the input of a corresponding amplifier, an output of the corresponding amplifier is connected to an input of a corresponding analog-digital converter, and the analog-digital converter converts a reception analog signal into a digital signal designed to be processed by the beam-formation computational circuit.

30. The radar according to claim 29, wherein the reception antennas are patch type antennas made on one and the same printed circuit.

31. The radar according to claim 30, wherein the mixers are made on said same printed circuit.

32. The radar according to claim 29, further comprising:
a metal band surrounding the mixers, said metal band being cut at places in which microwave connection lines pass towards the reception antennas; and
a metal cover covering the mixers with edges of the metal cover in contact with the metal band.

33. The radar according to claim 24, wherein a waveform transmitted by the transmission antenna is of the FMCW type, a continuous waveform whose frequency is modulated in ramps.

34. The radar according to clam 24, wherein a waveform transmitted by the transmission antenna is of the frequency-hopping type.

35. The radar according to clam 24, further comprising a local oscillator for powering the transmission antenna and the reception channels.

36. The radar according to claim 35, wherein a microwave line length between the local oscillator and a respective mixer is the same for all the mixers.

37. The radar according to claim 29, wherein, with the printed circuit being fixed to a face of a plate, the other face of the plate supports the bear-formation computational circuit.

38. A modular radar, comprising:
a radar including,
a plurality of reception antennas corresponding to a plurality of homodyne reception channel,
a transmission antenna positioned with respect to the plurality of reception antennas such that a distance between the transmission antenna and each consecutive reception antenna of the plurality of reception antenna respectively increases from one reception antenna to the next, and
a beam-formation computational circuit associated with the plurality of reception channels and configured to receive a reception signal from each of the homodyne reception channels,
wherein a spacing between each reception antenna is set so as to orient a homodyne leakage in a direction located in an angular zone of space not processed by the radar, and
wherein circuits included in the beam-formation computational circuit operate in parallel.

39. The modular radar according to claim 38, wherein a first module functions as a driver module, a local oscillator of the first module controls all other modules, and each module includes an amplifier at an input to amplify a signal of the local oscillator.

40. The modular radar according to claim 39, wherein an output of the amplifier for the local oscillator signal which is fed into reception circuits of the driver module also enters an input of a power circuit of a second module.

41. The modular radar according to claim 39, wherein a transmission antenna is included in the driver module, and is fed by the local oscillator of the driver module.

42. The radar according to claim 24, further comprising a shaft around which the radar rotates to sweep an interior of a container containing a material, the reception and transmission antennas being located so as to face the material.

43. The radar according to claim 24, further comprising an imaging function.

44. The radar according to claim 30, further comprising:
- a metal band surrounding the mixers, said metal band being cut at places in which microwave connection lines pass towards the reception antennas; and
- a metal cover covering the mixers with edges of the metal cover in contact with the metal band.

45. The modular radar according to claim 30, further comprising a shaft around which the radar rotates to sweep an interior of a container containing a material, the reception and transmission antennas being located so as to face the material.

46. The modular radar according to claim 30, further comprising an imaging function.

* * * * *